Patented June 12, 1923.

1,458,646

UNITED STATES PATENT OFFICE.

RUDOLF ENGELHARDT, OF LEVERKUSEN, NEAR COLOGNE, WILHELM LOMMEL, WIESDORF, NEAR COLOGNE, AND ANTON OSSENBECK, COLOGNE-ON-THE-RHINE, GERMANY, ASSIGNORS TO FARBENFABRIKEN VORM. FRIEDR. BAYER AND CO., OF LEVERKUSEN, NEAR COLOGNE, GERMANY.

PROCESS FOR ABSORBING ETHYLENE AND ITS HOMOLOGUES.

No Drawing. Application filed September 26, 1922. Serial No. 590,707.

*To all whom it may concern:*

Be it known that we, RUDOLF ENGELHARDT, WILHELM LOMMEL, and ANTON OSSENBECK, citizens of Germany, residing at Leverkusen, near Cologne, Wiesdorf, near Cologne, and Cologne-on-the-Rhine, respectively, Germany, have invented new and useful Improvements in Processes for Absorbing Ethylene and Its Homologues, of which the following is a specification.

This invention relates to a new and valuable process for absorbing ethylene and its homologues, which consists in using as the absorbing agent sulfuric acid which contains as catalyzer silver or compounds of silver with or without the addition of such substances as are capable of giving a foam or scum or an emulsion with sulfuric acid. By these catalyzers the rapidity of the technically important process of ethylene absorption by sulfuric acid is highly increased. While for instance 100 volumes of ethylene are absorbed in sulfuric acid (96 per cent) in a certain time 1300 volumes are absorbed in the same time when 0.1 to 0.2 per cent of silver sulfate are added to the sulfuric acid. The rapidity of this absorption can be increased still more by raising the temperature or by the addition of a small quantity of substances furnishing a foam or emulsion with sulfuric acid, such as oils or liquid hydrocarbons, for instance olive oil, castor oil, rape-seed oil, Turkey-red oil, chloroform, carbon tetrachloride, tetraline (tetrahydronaphthalene), carbon disulfide, or stearic acid or the like. The concentration of the sulfuric acid may be varied within wide limits without altering thereby the nature of this invention. The silver may be used for instance in a colloidal state, as a salt or as a complex compound.

The process may be employed, for instance, for separating ethylene and its homologues from admixture thereof with other gases such as air or hydrocarbon gaseous compounds such as methane, and for preparing ethyl sulfate, a well known step in the synthesis of ethyl alcohol, and for many other purposes.

We claim:—

1. The process which comprises absorbing ethylene and its homologues in sulfuric acid containing a silver catalyzer.

2. The process which comprises absorbing ethylene and its homologues in sulfuric acid containing a silver compound.

3. The process which comprises absorbing ethylene and its homologues in sulfuric acid containing a silver catalyzer and a substance capable of giving a foam or scum with sulfuric acid.

4. The process which comprises absorbing ethylene and its homologues in sulfuric acid containing a silver compound and a substance capable of giving a foam or scum with sulfuric acid.

In testimony whereof we have hereunto set our hands.

RUDOLF ENGELHARDT.
WILHELM LOMMEL.
ANTON OSSENBECK.